US008462231B2

(12) United States Patent
Nusbaum (10) Patent No.: US 8,462,231 B2
(45) Date of Patent: Jun. 11, 2013

(54) DIGITAL CAMERA WITH REAL-TIME PICTURE IDENTIFICATION FUNCTIONALITY

(76) Inventor: Mark E. Nusbaum, McLean, VA (US)

( * ) Notice: Subject to any disclaimer, the term of this patent is extended or adjusted under 35 U.S.C. 154(b) by 0 days.

(21) Appl. No.: 13/362,465

(22) Filed: Jan. 31, 2012

(65) Prior Publication Data

US 2012/0236178 A1 Sep. 20, 2012

Related U.S. Application Data

(60) Provisional application No. 61/457,378, filed on Mar. 14, 2011.

(51) Int. Cl.
*H04N 5/76* (2006.01)
*G10L 11/00* (2006.01)

(52) U.S. Cl.
USPC ............ 348/231.4; 348/231.2; 348/231.3; 704/270

(58) Field of Classification Search
USPC ........... 348/231.2, 231.3, 231.4; 704/275, 704/270
See application file for complete search history.

(56) References Cited

U.S. PATENT DOCUMENTS

| 4,951,079 | A | | 8/1990 | Hoshino et al. |
| 5,499,316 | A | | 3/1996 | Sudoh et al. |
| 5,731,852 | A | | 3/1998 | Lee |
| 5,787,399 | A | | 7/1998 | Lee et al. |
| 6,101,338 | A | * | 8/2000 | Bernardi et al. ............ 396/287 |
| 6,721,001 | B1 | * | 4/2004 | Berstis ...................... 348/231.3 |
| 7,163,151 | B2 | * | 1/2007 | Kiiskinen ............... 235/472.01 |
| 7,533,018 | B2 | | 5/2009 | Ma et al. |
| 7,733,389 | B2 | | 6/2010 | Kurosawa et al. |
| RE41,602 | E | | 8/2010 | Berstis |
| 7,809,565 | B2 | | 10/2010 | Coifman |
| 8,036,897 | B2 | * | 10/2011 | Smolenski et al. ........... 704/270 |
| 2003/0151676 | A1 | * | 8/2003 | Seki et al. .................. 348/231.3 |
| 2007/0263102 | A1 | * | 11/2007 | Hirabayashi et al. ...... 348/231.2 |
| 2011/0157420 | A1 | * | 6/2011 | Bos et al. ................... 348/231.2 |

FOREIGN PATENT DOCUMENTS

EP 1876596 A2 * 1/2008

OTHER PUBLICATIONS

"Design Rule for Camera File System" Wikipedia, http://en.wikipedia.org/wiki/Design_rule_for_Camera_File_system, 3 pages, May 2010.
"Design Rule for Camera File System", Japan Electronic Industry Development Association Standard, Dec. 1998, 48 pages.
"Exchangeable image file Format," Wikipedia, http://en.wikipedia.org/wiki/Exchangeable_image_file_format, retrieved from the Internet Jan. 31, 2012, 10 pages.

* cited by examiner

*Primary Examiner* — Nhan T Tran
*Assistant Examiner* — Xi Wang
(74) *Attorney, Agent, or Firm* — Nixon & Vanderhye P.C.

(57) ABSTRACT

A unique digital camera electronics and software associates substantially in real-time the image captured with a description of a photograph during the time frame when the photograph is first taken. After a photograph is taken, a user generates an audio description of the photograph including a set of image characterization data. For example, such image characterization data may identify "who" is in the photograph, "what" the photograph depicts (e.g., the Jefferson Memorial), "where" the photograph was taken, and "when" it was taken. Such an audio input is coupled to a speech recognition and processing subsystem in which the decoded voice data is transcribed into textual data that describes the picture and that is associated with its corresponding captured image data file. Such descriptive text is displayed at, for example, a location at a desired border of the photograph.

19 Claims, 6 Drawing Sheets

MOM AND DAD, HOME FRONT YARD, SILVER SPRING,
60TH WEDDING ANNIVERSARY, FEB. 10, 2006

| TAG | VALUE |
|---|---|
| Manufacturer | * * * * |
| Model | * * * * |
| Orientation (Rotation) | top - left [8 possible values] |
| Software | Ver1.01 |
| Date and Time | 2003:08:11 16:45:32 |
| YCbCr Positioning | centered |
| Compression | JPEG compression |
| x-Resolution | 72.00 |
| y-Resolution | 72.00 |
| Resolution Unit | Inch |
| Exposure Time | 1/659 sec. |
| FNumber | f/4.0 |
| Exposure Program | Normal program |
| Exif Version | Exif Version 2.1 |
| Date and Time (original) | 2003:08:11 16:45:32 |
| Date and Time (digitized) | 2003:08:11 16:45:32 |
| Components Configuration | Y Cb Cr - |
| Compressed Bits per Pixel | 4.01 |
| Exposure Bias | 0.0 |
| Max Aperture Value | 2.00 |
| Metering Mode | Pattern |
| Flash | Flash did not fire. |
| Focal Length | 20.1 mm |
| MakerNote | 432 bytes unknown data |
| FlashPixVersion | FlashPix Version 1.0 |
| Color Space | sRGB |
| Pixel X Dimension | 2240 |
| Pixel Y Dimension | 1680 |
| File Source | DSC |
| Interoperability Index | R98 |
| Interoperability Version | (null) |
| I. C. D. - "who" | Text or Pointer to Memory |
| I. C. D. - "what" | Text or Pointer to Memory |
| I. C. D. - "when" | Text or Pointer to Memory |
| I. C. D. - "where" | Text or Pointer to Memory |
| I. C. D. - "other" | Text or Pointer to Memory |

FIGURE 6

DIGITAL CAMERA WITH REAL-TIME PICTURE IDENTIFICATION FUNCTIONALITY

CROSS-REFERENCE TO RELATED APPLICATIONS

This application claims the benefit under 35 U.S.C. 119(e) of Provisional Application No. 61/457,378 filed on Mar. 11, 2011, entitled "Digital Camera With Picture Identification Functionality," the entire contents of which is hereby incorporated by reference in this application.

FIELD

The invention relates to portable devices having image capturing functionality. More particularly, the illustrative implementations relate to digital cameras, cell phones, PDA's and other electronic devices with camera features that receive input from a user and associate textual descriptions of pictures taken with respective image characterization data.

BACKGROUND AND SUMMARY

Since the camera became a staple consumer product, the ability to organize and retrieve photographs has been a challenge.

In the past, well organized amateur photographers, had pictures developed and promptly placed them in photo albums. Oftentimes, the photo albums would be labeled in some fashion identifying an event or vacation, characterizing the photographs in the albums.

Some photographers meticulously labeled photographs. Many photographers creating photo albums neglected to meaningfully label the photographs. Still other photographers stored photographs in drawers, boxes, or the like in less organized arrangements.

Frequently, many years after taking a photograph, it is extremely difficult for a viewer of the photograph, even the photographer, to accurately identify the photograph. As decades passed, accurately identifying babies, distant relatives and a multitude of photographed images became a challenging guessing game.

With the advent of digital cameras, amateur photographers have become less judicious in the number of photographs taken. For the vast majority of photographers, organizing the digital photographs remains a challenge.

While conventional software exists for organizing such digital photographs, many typical digital camera users download photographs to a PC and do not take the time to organize and identify such downloaded photographs.

Many users employ PowerPoint presentations to display vacation photos to friends and family. Photographs taken on a vacation that are utilized in a PowerPoint presentation are not self-identifying and are typically presented accompanied by an oral explanation by one of the vacationers.

The illustrative implementations employ unique digital camera electronics and software for associating in real-time during the picture taking/scene capturing process, the image captured together with a description of the photograph during the time frame when the photograph is first taken. More particularly, the illustrative implementations are embodied in a portable image capturing device such as a digital camera, a cell phone having camera functionality, a PDA having camera functionality or any other electronic device having camera functionality. Such devices preferably include a subsystem permitting the photographer to identify the photograph taken with a set of image characterization data, such that the image characterization data is associated with the image file.

More particularly, in an illustrative implementation, just prior or just after a photograph is taken, a user is permitted to generate an audio description of the photograph including a set of image characterization data. For example, such image characterization data may identify "who" is in the photograph, "what" the photograph depicts (e.g., the Jefferson Memorial), "where" the photograph was taken, and "when" it was taken.

Such an audio input, in accordance with an illustrative implementation, is coupled to a voice (i.e., speech) recognition and processing subsystem in which the decoded speech data is transcribed into textual data that describes the picture and that is associated with its corresponding captured image data (e.g., DCF) file. In an illustrative implementation such descriptive text is displayed at, for example, a location at a desired border of the photograph.

In this fashion, a user, regardless of the output media chosen to be the recipient of the image file and the descriptive text, the photograph is generated along with image characterization data to generate a data package that meaningfully identifies the photograph many years after the photograph is taken.

In accordance with an illustrative implementation, as opposed to the generated transcription being a rote translation of the words spoken by the photographer, the identification system is designed to extract from the user's input image characterization data (ICD) categories. For example, as journalists are trained in reporting on an event to include the "who, what, when, where, and why" information associated with the event, illustrative image characterization categories will include "who" is depicted in the picture, e.g., Mom and Dad, "what" the photograph depicts, e.g., the Eifel Tower, "where" the picture was taken, e.g., Paris, France, and "when" the picture was taken, e.g., Oct. 1, 2010.

In this fashion, the judicious selection of predesigned target categories of image characterization data, permits the speech recognition and transcription systems to be less complex and able to more accurately transcribe the photographers description of the image.

Additionally, in an illustrative implementation, an image/photograph retrieval system is described herein where, for example, image files are retrieved based on a wide range of criteria including, for example, the "who", "what", "when", and "where" categories of image characterization data. In this fashion, by, for example, inputting "Dad" every photograph where Dad is depicted may be immediately accessed and displayed on the device LCD display or on a interconnected PC or home television. Moreover, such pictures of Dad may be retrieved such that they are sequenced chronologically based on the date the photograph was taken in light of the "when" image characterization field.

Similarly, all photographs may be readily accessed based on the "where" field to thereby permit a user to access every photo relating to a favorite vacation spot, for example, the Amalfi Coast of Italy.

Moreover, in an illustrative implementation, the camera includes a WiFi communications module to, for example, enable email functionality. In an illustrative implementation, one or more email addresses are stored after entry by the owner during, for example, the initial time the camera is used. Thereafter, predetermined control key operations initiate the automatic emailing of, for example, the most recently captured image to the one or more stored email addresses. In illustrative implementations, it is also contemplated that additional email operations may be performed by keying in the addresses or via replying to a received email.

These and other features of the illustrative implementation will become apparent from a review of the drawings of which:

DETAILED DESCRIPTION OF THE INVENTION

Figure 1:
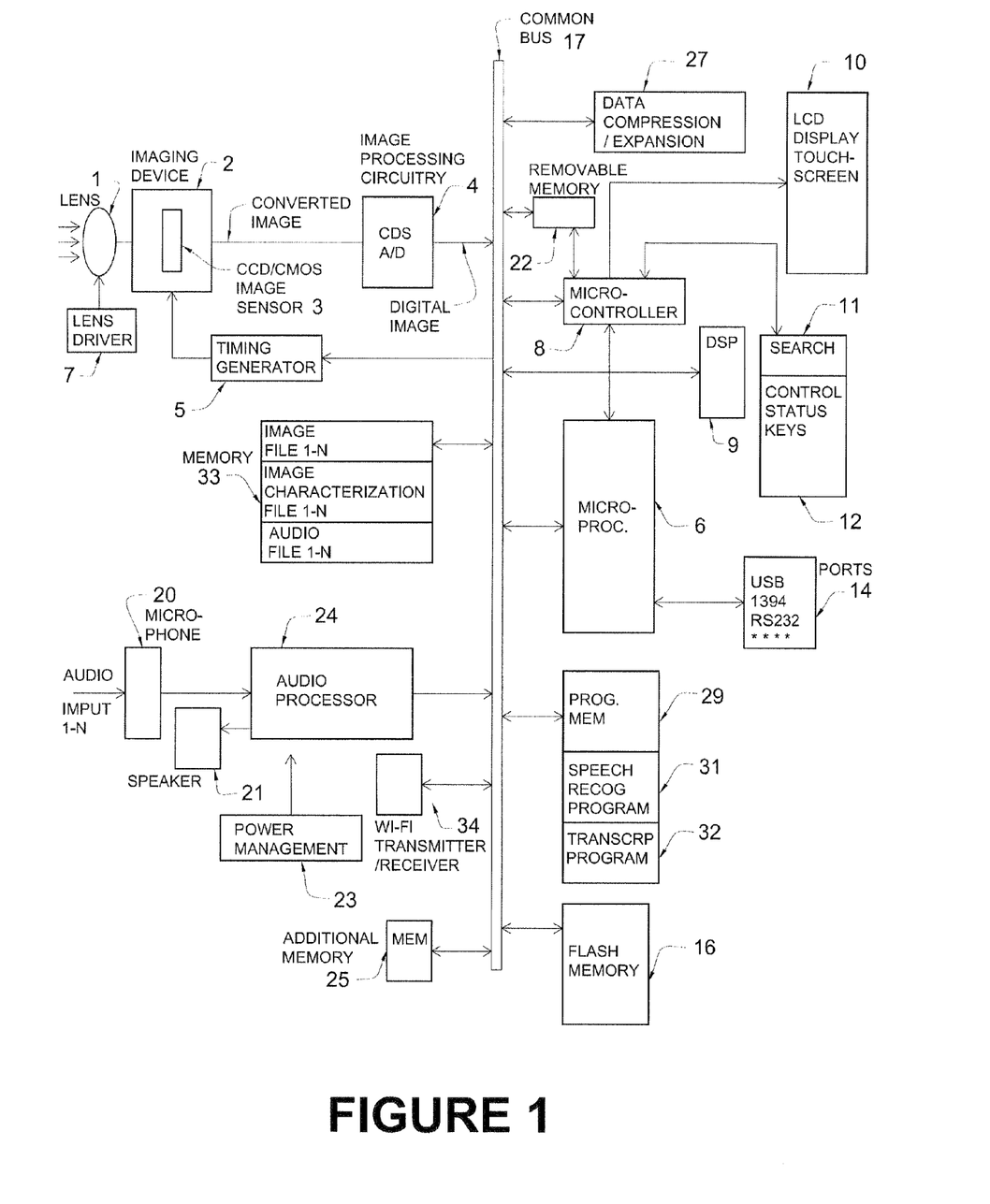
FIG. 1 is a block diagram of a portable image capturing device illustrating an exemplary implementation.

FIG. 1 is a block diagram of a non-limiting, illustrative portable image capturing device implementation that depicts an exemplary digital camera having a speech recognition and transcription subsystem. As shown in FIG. 1, the illustrative digital camera includes a conventional optical system including an imaging device 2 having a CCD/CMOS image sensor 3. The image sensor 3 captures an optical image of a target and the imaging device 2 outputs a converted image signal. A timing generator 5 under the control of microprocessor 6 generates image sensor control/drive signals.

The imaging device 2 in response to the drive/control signals photoelectrically converts image data into a converted image signal. Image processing circuitry 4 includes, as will be appreciated by those skilled in the art, a correlated double sampling (CDS) circuit that performs correlated double sampling processing on the image signal to, for example, remove noise from the image data. The image processing circuitry 4 also includes an analog to digital circuit that converts the processed image data into a digital image signal. The digital image signal is transferred via common bus 17 to microprocessor 6.

Microprocessor 6 operating, for example, in conjunction with digital signal processor (DSP) 9, performs image processing operations well known to those skilled in the art, including conversion of the digital signal into a luminance signal and color/difference signal using well known luminance/color-difference processing to perform YUV conversion.

Each frame of YUV data output from microprocessor 6 and/or DSP 9 is transferred to one or more of the system memory files, including memory 16 that may be, for example, a flash memory.

The processing system may also include a microcontroller 8 that serves as a display controller for LCD/touchscreen display 10 and interfaces with various other system components via common bus 17, as shown in FIG. 1, or via direct connections.

The YUV data stored in flash memory 16 may be accessed and appropriately enlarged or reduced within, for example, microcontroller 8 for display on LCD display 10 or on an external display accessed via an external port, such as a USB, 1394, or RS 232 port (14).

In an illustrative embodiment, at least one USB port 14 is accessible via a camera housing door (not shown) that swings open to expose a movable USB connector. The camera housing also may include a mechanical member connected to the USB connector that slides along a channel in the camera housing to expose the USB connector such that it may be electrically connected to a USB port on any of a variety of electronic devices such as, for example, a desktop or laptop computer to provide power or to transfer photographs, without requiring the user to supply wires/connectors for making such a connection.

In illustrative embodiments, a wide range of memory devices are available for program and/or data storage including flash memory 16, program memory 29, removable memory 22, and additional memory devices 25 (represented for illustration purposes only as one device) that may include, for example, DDR 2/DDR3 SDRAM, and removable memories including SD/MMC/SM/xD memory cards.

When capturing a still image based, for example, on a JPEG format, a data compression/expansion processor 27, coupled to common bus 17, compresses the YUV data accessed from flash memory 16. After the compressed YUV data is converted into the appropriate file format by, for example, microcontroller 8, data in the appropriate file format is stored in, for example, removable memory 22, that may be in the form of a SD/MMC/SM/xD memory card) as still image data.

In a moving image capturing mode, frames of the YUV data are sequentially supplied to the data compression/expansion processor 27 to be compressed and encoded in a moving image recording format known to those skilled in the art. The frames of the YUV data also may be transferred to removable memory 22 to be stored as a moving image file through microcontroller 8. In a playback mode, the data compression/expansion processor 27 operates to expand the still image data or moving image data read from the removable media 24.

The illustrative camera shown in FIG. 1 also includes a microphone 20 that receives audio input in the form of for example, image descriptions from the user. An audio processor 24 described below, processes and temporarily stores the audio signal for further processing by the speech recognition and transcription system described below. The audio processor 24 also generates an audio output that is coupled to speaker 21. In accordance with an illustrative implementation, audio processor 24 in conjunction with microprocessor 6 accesses and executes voice recognition and transcription-related speech recognition program 31 and the transcription program 32 stored in program memory 29.

In an illustrative implementation the camera exemplified in FIG. 1 includes a wireless WiFi interface 34 having well-known hardware and driver software for wirelessly transmitting and receiving data including the capability to email images and the associated text image characterization data (ICD) entered by a user during the picture taking process to instantly email an image along with any user entered associated ICD (image characterization data). For example, in one illustrative implementation to email an image, the camera may provide a displayed email prompt and/or control menu option to enable entry of an email address and selection of a Wireless LAN. In this and other related implementations, the camera searches for any local WiFi networks in the area and provides the user with a list of available WiFi networks and then sends the image and/or allows the user to select particular images to send to the entered email address via the selected WiFi connection. Confirmation of a successful email transmission is also provided via the camera display or audio output.

In such illustrative email-related implementations, one or more email addresses may be stored, for example, after entry by the owner during, for example, the initial time the camera is used. Thereafter, predetermined control key or other user operations initiate the automatic emailing of, for example, the most recently captured image to the one or more stored email addresses in an automatic emailing mode that may be entered upon an appropriate control key actuation by a user during camera operation. In illustrative implementations, it is also contemplated that additional email operations may be performed by keying in the addresses or via replying to a received email. As indicated above, confirmation of a successful email transmission is also provided via the camera display or audio output.

The illustrative camera includes a wide array of control/status keys 12, including a power key, a zoom control key, a shutter control key, a menu key, a picture email initiating key that may be used to initiate emailing a captured image along with any user entered associated ICD. In an illustrative embodiment, a mode switching key is used to switch among various modes, including still image capturing mode, moving image capturing mode, and playback mode, as well as image characterization mode, as will be explained in more detail herein. In an illustrative implementation, the control functions may be displayed as virtual keys on the LCD touchscreen and selected in accordance with conventional touchscreen technology.

A full range of conventional camera operations including the generation of lens drive signals, automatic focus and zooming operations are well known to those skilled in the art and are contemplated for illustrative camera shown in FIG. 1. The camera system of FIG. 1 includes a power/battery management system 23, as well as a power control system, to cause components to power down during non-usage (not shown).

Program memory 29 includes various programs utilized in conjunction with the illustrative implementations, including speech recognition program 31 and transcription program 32. Additionally, in accordance with an illustrative implementation, memory 33 stores image files 1-N, relating to the photographs taken by the camera shown in FIG. 1, together with associated image characterization files 1-N which are described further herein. In an illustrative implementation, memory 33 also stores audio files 1-N used in generating the final textual image characterization data.

In an illustrative implementation, embodied within the camera memory system, such as, for example, memory 33 is a memory table for storing associations relating to the user entered image characterization data. In such an implementation, the table stores an association between an image file number that is automatically generated by the camera for each image that is taken and that is resident in, for example, one column of the table and the image characterization data (ICD) that is resident directly or indirectly in a second column of the table.

Such an association of an image file number and the ICD is generated in real-time after the image is taken and the user vocally inputs the ICD (the who, what, when, where, etc.) that may, for example, reveal among other information that the image depicts "mom and dad" visiting "the Amalfi coast" celebrating their 30th wedding anniversary.

As will be appreciated by those skilled in the art, such an image file number may be in the form of a DCF/DCIM file number utilized in conventional digital camera file systems. Such a file system includes, for example, a directory structure, file naming methodology, character sets, file formats, formats for metadata, etc. In this fashion, a specific alphanumeric code or file number (DCIM) is assigned to each image which is then associated with a set of image characterization data, for example, by a pointer that identifies a memory address containing such ICD in the camera memory space.

It should be understood that although various memory devices are depicted in FIG. 1 as being separate memory devices, such as memory 33 and flash memory 16, such memory devices may be implemented utilizing one or more memories by combining at least two of the memories shown in a single memory device. Similarly, while FIG. 1 shows microprocessor 6, microcontroller 8 and DSP 9, and audio processor 24, such processing functions may be performed by one or more processors such that, for example, two or three of the processors shown in FIG. 1 may have their functionality incorporated into a single processor.

A person skilled in the art will recognize that commercial speech recognition software systems are well known and are available, such as Dragon Naturally Speaking offered by ScanSoft and Via Voice marketed by IBM. The speech recognition software is executed by microprocessor 6 and/or audio processor 24. The speech recognition software includes a speech recognition module 31 that is responsible for parsing input speech as digitized by an audio codec and analog to digital converter included in audio processor 24.

Well known speech recognition algorithms are included in such voice recognition software 31. For further details regarding the speech recognition methodology see, for example, U.S. Pat. No. 7,809,565, which is incorporated herein by reference. Also see U.S. Pat. No. 7,533,018, describing a speaker independent speech recognition and transcription system which is hereby incorporated by reference.

Figure 2:
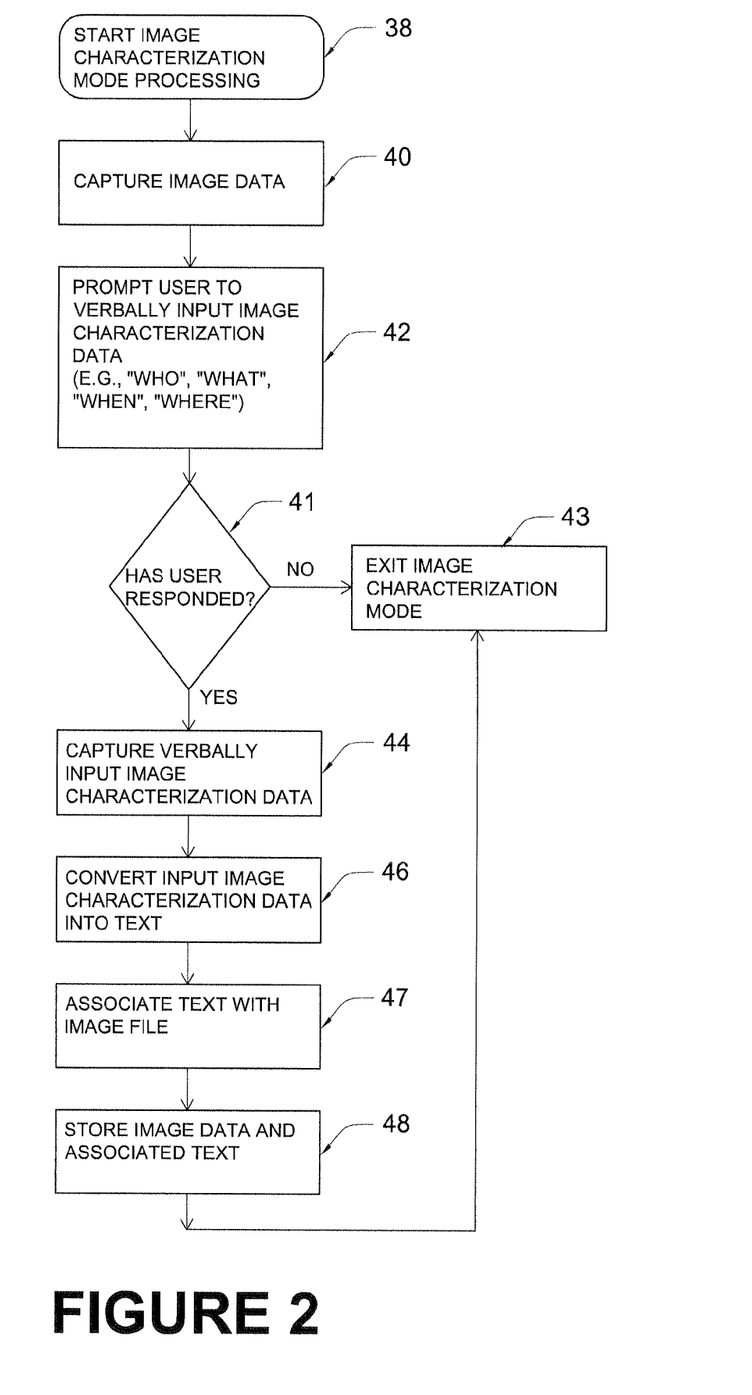
FIG. 2 is a flowchart delineating the sequence of operations of the portable image capturing device of an illustrative implementation.

FIG. 2 is a flowchart delineating the sequence of operations of a portable image capturing device of an illustrative implementation depicting image characterization mode processing 38. As shown in FIG. 2, a user initially operates the digital camera shown in FIG. 1 so as to capture image data by pressing a shutter release button. When a user depresses the shutter release button disposed, for example, on the top of the camera a predetermined amount, automatic focus/automatic exposure control is performed. When the shutter release button is fully depressed, still image capture operation is initiated (40).

After the image data is captured, in an illustrative implementation, the user is prompted to verbally input image characterization data describing the photograph just taken (42). For example, a prompt may initially request that the user identify "who" the picture is taken of. The prompt may be displayed on LCD display 10, shown in FIG. 1.

After the prompt, the user, in an illustrative implementation, will be a given a predetermined amount of time to respond. A user may, for example, in an illustrative embodiment, indicate that "Mom and Dad" are portrayed in the picture as, for example, shown in FIG. 4. In an alternative implementation, a user may enter the image characterization data by accessing (via control keys 12 or touchscreen 10) a prestored database of descriptive terms created by the user prior to a vacation, or a notable event (e.g., mom, dad, Venice, etc.).

If the user does not respond in a predetermined period of time or, for example, in an illustrative embodiment, depresses a control key to override the image characterization input mode of operation (41), the routine will exit the image characterization mode (43).

If, in an illustrative implementation, the user responds within the predetermined time period, the system will capture the verbally input characterization data (44). Once all the image characterization data has been captured and confirmed to be accurate (see, for example, FIG. 3 below), the image characterization data is stored in a database in one of the memory devices shown in FIG. 1, e.g., large capacity flash memory 16. In an illustrative implementation and in a manner known to those skilled in the art, the database is designed to link each of the significant terms in the image characterization data, e.g., mom, dad, an event such as wedding anniversary, the date the picture was taken, the location at which the picture was taken, etc., with, for example, the address of the associated image file.

Thereafter, the routine operates to recognize the characterization of the target image (e.g., "DAD") spoken by the user and converts the input audio image characterization data into text (46) to generate part of a text file. The text (e.g., DAD) is associated with the appropriate image file (47) as the image characterization data is entered to link the image characterization data to the photograph which it characterizes. Thus, the system generates a data package including the digital photograph and the image characterization data. Thereafter, the image data and all the associated text are stored in memory 33, which includes image files 1-N and associated image characterization text files 1-N (48). After all the image characterization data has been entered, the routine exits the image characterization mode (43)

Figure 3:
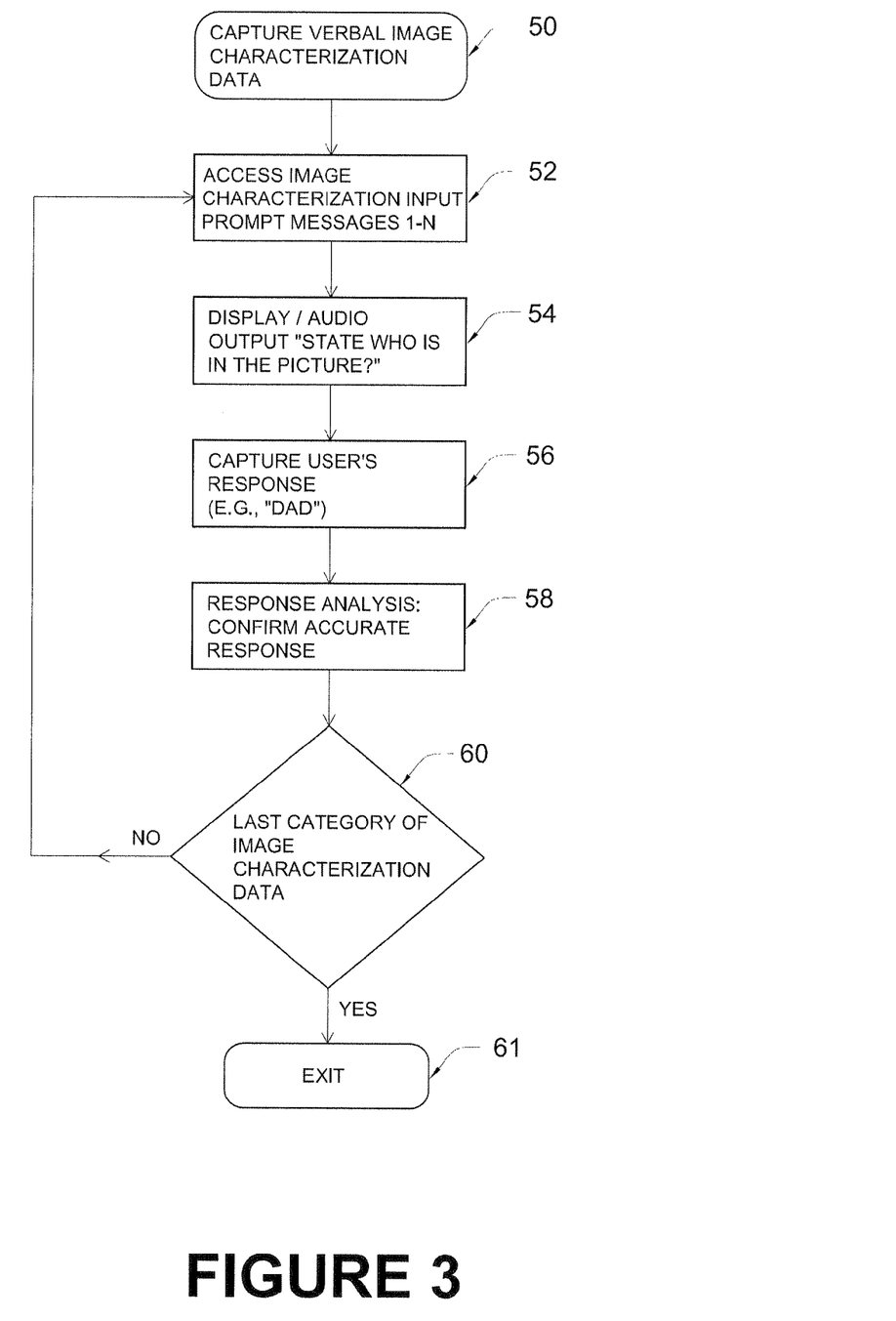
FIG. 3 is a flowchart which delineates a sequence of operations involved in the capturing of data in further detail.

FIG. 3 is a flowchart which delineates a non-limiting exemplary sequence of operations involved in the capturing of image characterization data (e.g., see block 44-FIG. 2) of an illustrative implementation in further detail (50). Initially, the system accesses the current image DCF/DCIM file number and accesses a set of image characterization input prompting messages to be presented to the user (52). The prompting messages may be presented to the user by any well known mechanism. For example, messages may be presented to the user via a series of exchange sequences by stepping the user through: 1) inputting "who" is depicted in the picture, 2) inputting "what" is depicted in the picture, 3) inputting "where" the picture was taken, and 4) inputting "when" the picture was taken. As will be appreciated by persons skilled in the art, the inclusion of such categories of image characterization data aids in the ability to accurately recognize a verbal input since the nature of the user's input has known characteristics. For example, a response to the prompt "who is depicted in the picture" would be anticipated to trigger a response having certain boundaries, e.g., the identification of a person's name, e.g., Bob, or a relationship, e.g., Dad.

In an exemplary embodiment, four categories of image characterization data are utilized. However, it should be recognized that various further image characterization categories may be utilized including memorable events that occurred at the time the picture was taken, e.g., first word spoken, first date, any noted accomplishment, etc. In an alternative implementation, a user may input codes that are used to access a table that prestores image characterization descriptors.

In accordance with an illustrative embodiment, in the first prompt relating to the first category of image characterization data, LCD display 10 displays "state who is in the picture" (54). In an alternative implementation, the system generates an audio output via speaker 21 that verbally prompts the user to enter, by speaking, an appropriate image characterization.

Thereafter, the system will capture the audio response that is input by the user in real-time (i.e., either substantially immediately before taking the photo, concurrently with taking the photo, or substantially immediately after taking the photo) during the picture taking process (56). The response may be, for example, "Mom and Dad." The system stores the image character data associated with the current DCF/DCIM file number.

The routine then enters response analysis processing and confirms the accuracy of the response (58). In an illustrative implementation, the speech recognition program 31 and the transcription program 32 respectively extract relevant information to the current category of expected image characterization data being processed ("who," "what," "when," or "where") and generate associated image characterization text data (e.g., "Mom and Dad," if the "who" category is being processed). In accordance with an illustrative implementation, LCD display 10 may be a touchscreen display. The accuracy confirmation may, in an illustrative embodiment, be performed by displaying alternative possible detected responses to permit a user to select the appropriate alternative. For example, after a user input that yields two possible results, the system may, for example display "Steven" and "Stephen" and permit the user to select the most accurate alternative. In accordance with an alternative implementation after a determination has been made as to the user's response, the response may be to permit the user to verify a displayed projection of the response by, for example, either verbalizing "Yes" or depressing an appropriate control key, or by editing the displayed projection in any appropriate manner known to those skilled in the art to identify the desired image characterization data.

In an illustrative embodiment, the camera permits the user to input information pertaining to image characterization data to assist the speech recognition software in identifying the correct data. For example, a user may input biographical data or data reflecting, for example, planned vacations to provide the system with a set of information that may assist in intelligently interpreting the user's audio input. In an illustrative implementation, the system generates a user profile that is updated over time to improve the accuracy of the transcription over time.

After the accuracy of the user input has been confirmed at block 58, a check is made to determine whether the last category of image characterization data has been reached (60). If the last category has not been reached, the routine branches back to block 52 to access the next prompt. If the last category has been reached, the capture image characterization data processing is completed (61).

Figure 4:
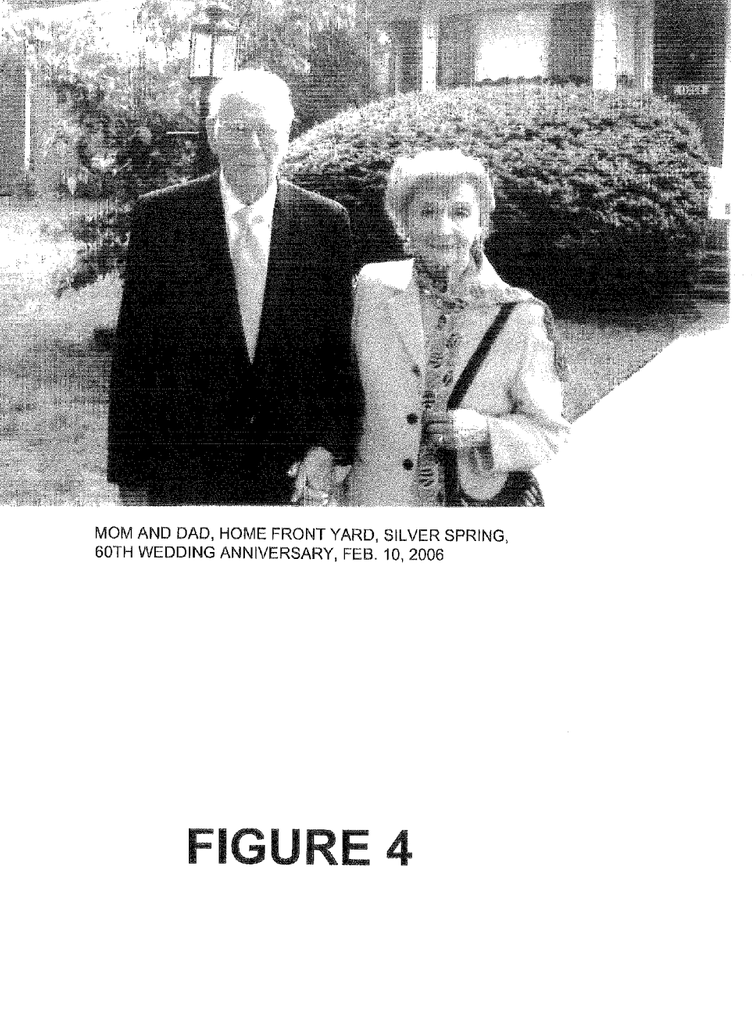
FIG. 4 is an illustrative example of a photograph with associated image characterizing data.

FIG. 4 is an illustrative example of a photograph with associated image characterizing data. As shown in FIG. 4, "Mom and Dad" are depicted with their home in the background. As indicated in FIG. 4 the picture was taken on Feb. 10, 2006. As shown in FIG. 4, image characterization data may include an identification of special events, such as "60th Wedding Anniversary." In an exemplary implementation as is illustrated in FIG. 4, the user's audio input was utilized to identify "who" is in the picture (Mom and Dad), "what" is being depicted in the picture (Mom and Dad's Home front yard), "where" the picture was taken (Silver Spring, Md.) and "when" the picture was taken (Feb. 10, 2006). Such data is preferably input in substantially real time, just before or just after the picture is taken. In an alternative implementation, the image characterization data may be entered after a series of pictures have been taken and are being previewed by a user at a convenient time after a photographic session.

Figure 5:
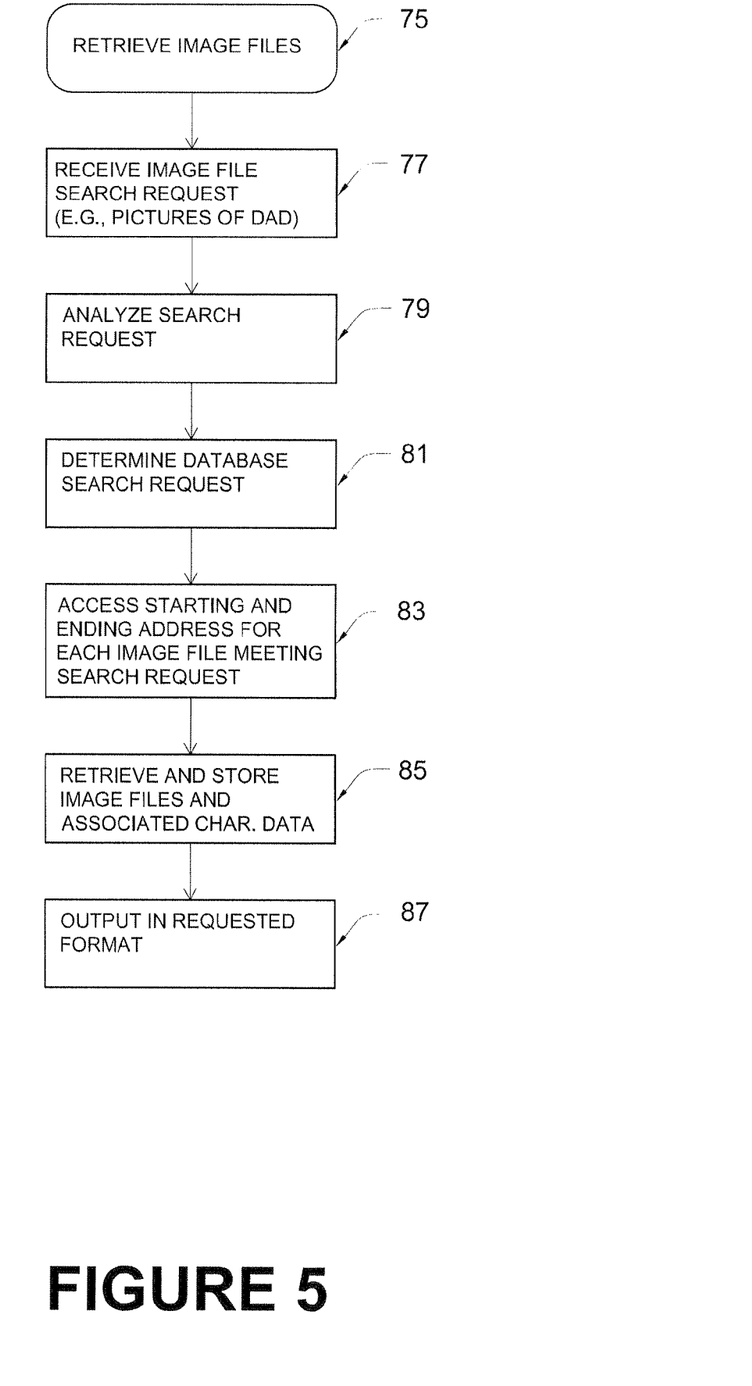
FIG. 5 is a flowchart illustrating the sequence of operations performed in retrieving image files and associated text data.

FIG. 5 is a flowchart illustrating the sequence of operations performed in retrieving desired photographs with associated image characterization data. As shown in FIG. 5, the "retrieve" image/text files mode is initiated (75) upon a user hitting search control key 11, shown in FIG. 1, and entering an image file search request for retrieving various pictures.

The routine, after receiving an image file search request to find, for example all pictures of Dad (77), analyzes the search request to determine, for example, whether the search is a single or multiple parameter search request (79). For example, a user may request all pictures depicting "Dad". The user may also request such pictures to be accessed by retrieving the oldest picture first followed by pictures in chronological order. Alternatively, in an exemplary implementation, the most recent pictures of "Dad" may be accessed first at the user's selection.

After the user's search request has been analyzed (79) to determine the nature and extent of the request (e.g., multiple parameter request with requested date ordering), a database search request is determined (81). As noted in conjunction with the description of FIG. 2, once all the image characterization data has been captured and confirmed to be accurate, the image characterization data is stored in a database in one of the memory devices shown in FIG. 1, e.g., large capacity flash memory 16. As indicated above, the database is designed to link each of the significant terms in the image characterization data, e.g., mom, dad, an event such as wedding anniversary, the date the picture was taken, the location at which the picture was taken, etc., with, for example, the address of associated image file.

The database in then searched to, for example, obtain the address information (83) necessary to retrieve the image files to obtain DCIM file numbers corresponding to photographs that satisfy the requirements of the search request (85). In an illustrative implementation, such address information may include the start and end address of the image file and the associated image characterization data as would be required to render the contents of, for example, a series of pictures in the format shown in FIG. 4. The identified image files and associated image characterization meeting the search request are then retrieved and temporarily stored in one of the memory devices shown in FIG. 1 (85)

The image/text files meeting the search request retrieved from the memory subsystem shown in FIG. 1 are then output in any of a variety of display presentation formats selected by the user (87), e.g., on a large screen external display coupled via ports 14, or in thumbnail fashion in a group, one photo at a time, etc.

Although a photo database may reside on one of the camera memory devices, such a camera-based database may be loaded into a database associated with a larger capacity memory associated with a user's home computer network.

In an illustrative implementation, the pictures retrieved of "Dad" may be utilized to construct a photo album, tracking "Dad's" life over the number of decades for which photos exist in any memory/database in which the pictures have been stored.

In accordance with an illustrative implementation, the ability to retrieve photos in an efficient manner is set in place at essentially the same time that the photo is initially taken through the use of the image characterization data. In this manner, vacation albums may be efficiently generated by accessing, for example, all photographs relating to a trip to Paris, France during a particular time period. Likewise, PowerPoint presentations may be efficiently generated by accumulating potential PowerPoint slides by accessing desired image characterization data.

Figure 6:
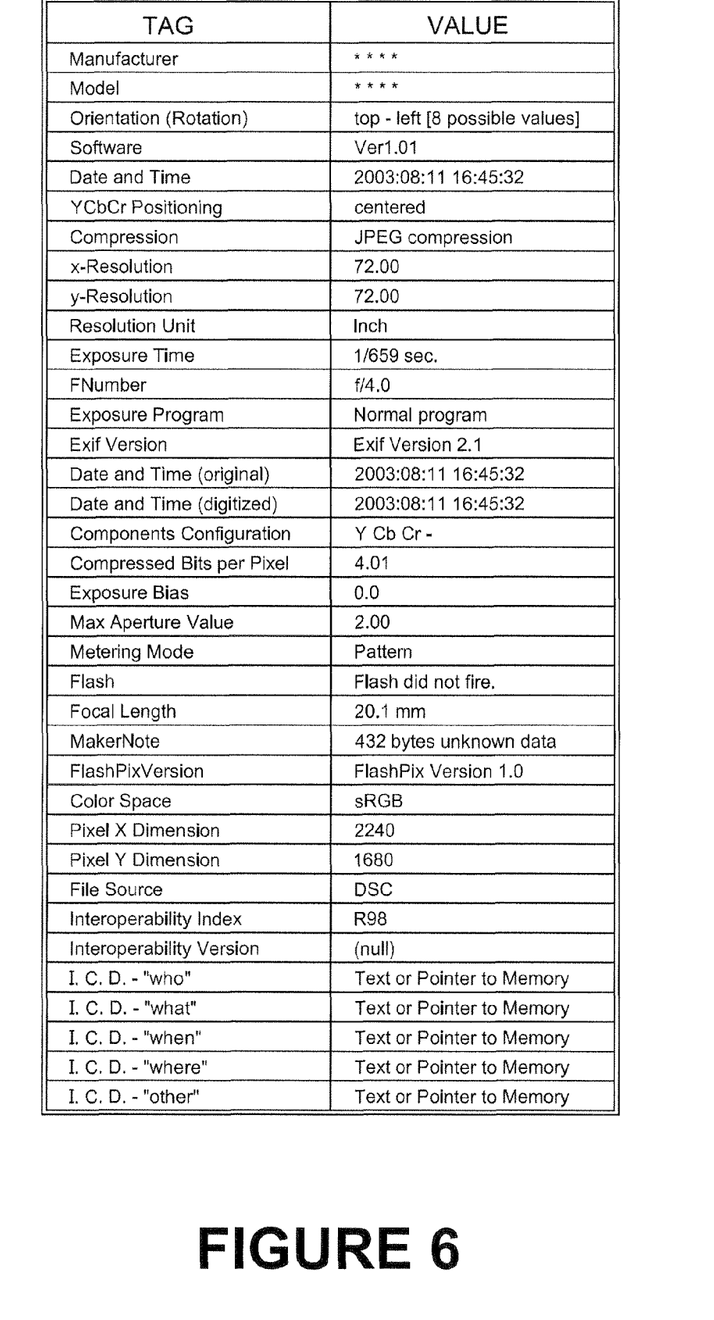
FIG. 6 is an illustrative table showing how the image characterization data is incorporated into conventional Exif data stored as part of compressed JPEG image data.

FIG. 6 is a table that illustrates how the image characterization data (ICD) described herein may be incorporated into conventional Exif data stored as part of compressed JPEG image data for each individual image taken by the camera illustrated in FIG. 1. In addition to the image data that is compressed in accordance with conventional JPEG image data format a limited set of additional technical digital data about the particular photograph is typically associated with an image file in accordance with the Exif standards.

As shown in FIG. 6, a stored table includes a tag column and a value column. The tag column includes such information as manufacturer, camera model compression, exposure time, focal length and other entries as shown together with corresponding values that identify a specific manufacture (e.g., Casio), camera model (QV 4000), compression format (JPEG compression), exposure time (1/659 sec.) focal length (20.1 mm), etc.

In accordance with an illustrative implementation, image characterization data (ICD) is added as an extension to the Exif data for each photograph taken. As shown in FIG. 6, the ICD data is disclosed in the "tag" column to identify "who," "what," "when," "where," and other image characterization data. In the "value" column, either text may be entered to directly including the ICD information corresponding to "who," "what," "when," "where," and other image characterization data, respectively, or address pointers to such data may be stored.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A digital device including a camera subsystem with enhanced picture identification capability for generating digital photographs of target scenes having a target scene image and descriptive text generated in response to image characterization prompting messages comprising:

an image capturing device for capturing a digital image of a target scene during a target scene capture mode, said target scene capture mode including an image capturing segment and an image characterization data capturing segment;

an audio input device for generating an audio signal indicative of a user's description of the target scene entered during said image characterization data capturing segment substantially in real time with capturing a digital image of the target scene;

a processing subsystem for initiating target scene image characterization processing substantially in real time with the image capturing device capturing the image of said target scene during said target scene capture mode;

a storage device for storing information relating to: a first image characterization prompting message prompting the identification of "who" is depicted in the target scene, a second image characterization prompting message prompting the identification of "what" the target scene depicts, a third image characterization prompting message prompting the identification of "where" the target scene is located, and a fourth image characterization prompting message prompting the identification of "when" the digital image of the target scene is being captured;

said processing subsystem being operatively coupled to said storage device and being configured to access a plurality of said image characterization prompting messages and to generate a plurality of prompting messages for presentation to the user to extract from the user a description of the target scene including information corresponding to a plurality of image characterization categories selected from the group consisting of: a first image characterization category identifying "who" is depicted in the target scene, a second image characterization category identifying "what" the target scene depicts, a third image characterization category identifying "where" the target scene is located, and a fourth image characterization category identifying "when" the digital image of the target scene is being captured;

said processing system being operatively coupled to said audio input device and being configured to receive the audio signal indicative of a user's description of the target scene for recognizing the user's audio description of the target scene specified by a user in response to a prompting message and for generating text characterizing the target scene, said processing subsystem being configured to associate an image file with text identifying the target scene generated in response to image characterization prompting messages; and an output generating subsystem using text generated in response to at least one prompting message for generating a digital photograph of the target scene including text identifying the target scene falling within a plurality of said image characterization categories selected from a group consisting of a first image characterization category identifying "who" is depicted in the target scene, a second image characterization category identifying "what" the target scene depicts, a third image characterization category identifying "where" the target scene is located, and a fourth image characterization category identifying "when" the digital image of the target scene is being captured.

2. A digital device according to claim 1, wherein said first prompting message and said second prompting message respectively request the user to verbally input who is depicted in the target scene image and the location of the scene.

3. A digital device according to claim 1, wherein said first prompting message and said second prompting message request respectively request the user to verbally input who is depicted in the target scene image and the date the picture was taken.

4. A digital device according to claim 1, wherein one of said first prompting message and said second prompting message requests the user to verbally input the occasion depicted in the target scene.

5. A digital device having a camera subsystem with enhanced picture identification capability for generating digital photographs of target scenes having a target scene image and descriptive text generated in response to image characterization prompting messages comprising:

an image capturing device for capturing a digital image of a target scene during a target scene capture mode, said target scene capture mode including an image capturing segment and an image characterization data capturing segment;

a storage device for storing information indicative of a plurality of image characterization prompting messages selected from a group consisting of: an image characterization prompting message prompting the identification of "who" is depicted in the target scene an image characterization prompting message prompting the identification of "what" the target scene depicts, an image characterization prompting message prompting the identification of "where" the target scene is located, and an image characterization prompting message prompting the identification of "when" the digital image of the target scene is being captured;

an audio input device for generating an audio signal indicative of a user's description of the target scene image provided in response to a prompting message;

a processor subsystem operatively coupled to said storage device and said audio input device for generating a sequence of prompting messages and for presenting each prompting message to the user to prompt the user to verbally input image characterization data identifying the target scene image; said processing system being configured to access said storage device and to generate a first prompting message and present said first prompting message to the user to verbally input image characterization data identifying the target scene image, said first prompting message requesting the user to describe the target scene to provide information selected from the group consisting of: identifying "who" is depicted in the target scene, identifying "what" the target scene depicts, identifying "where" the target scene is located, and identifying "when" the digital image of the target scene is being captured;

said processing subsystem being configured to capture a user's verbal description of the target scene image that is provided by the user in response to said first prompting message in substantially real time with the capturing of the target scene image;

said processing subsystem being configured to access said storage device to generate a second prompting message and present said second prompting message to the user to verbally input image characterization data further identifying the target scene image, said second prompting message requesting the user to describe the target scene to provide information selected from the group consisting of" identifying "who" is depicted in the target scene, identifying "what" the target scene depicts, identifying "where" the target scene is located, and identifying "when" the digital image of the target scene is being captured, said second prompting message requesting information that is different from the information identified in said first prompting message;

said processing subsystem being operatively coupled to receive the audio signal indicative of a user's description of the target and being configured to recognize the user's audio description of the target in response to said first prompting message and said second prompting message and for generating a text file identifying a plurality of items characterizing the target scene, said processing subsystem being configured to associate an image file with the text file identifying the target scene; and an output generation subsystem for generating a digital photograph of the target scene having a text data portion including a first text segment including information provided in response to said first prompting message and a second text segment information provided in response to said second prompting message, wherein the text data portion identifies the target scene by including text falling within a plurality of target scene image characterization categories selected from the group consisting of: identifying "who" is depicted in the target scene, identifying "what" the target scene depicts, identifying "where" the target scene is located, and identifying "when" the digital image of the target scene is being captured.

6. A digital device according to claim 5, wherein said first prompting message and said second prompting message request the user to verbally input who is depicted in the target scene image and the location of the scene.

7. A digital device according to claim 5, wherein said first prompting message and said second prompting message request the user to verbally input who is depicted in the target scene image and the date the picture was taken.

8. A digital device according to claim 5, wherein one of said first prompting message and said second prompting message requests the user to verbally input the occasion depicted in the target scene.

9. A method of operating a digital device having a camera subsystem and a processing subsystem, said digital device providing enhanced picture identification capability by generating digital photographs of target scenes having a target scene image and descriptive text generated in response to image characterization prompting messages comprising:

capturing a digital image of a first target scene image during a target scene capture mode, said target scene capture mode including an image capturing segment and an image characterization data capturing segment;

generating, by the processing subsystem, a first prompting message and presenting the first prompting message to a user to verbally input image characterization data identifying the first target scene image during said image characterization data capturing segment of said target scene capture mode, said first prompting message requesting the user to describe the first target scene to provide information falling within a first one of a plurality of image characterization categories selected from the group consisting of:

identifying who is depicted in the first target scene, identifying what the first target scene depicts, identifying where the first target scene is located, and identifying when the digital image of the first target scene is being captured;

capturing the user's verbal description of the first target scene responding to said first prompting message in substantially real time with the capturing of a target scene image;

generating, by said processing subsystem, a second prompting message and presenting the second prompting message to the user to prompt the user to verbally input image characterization data during said image characterization data capturing segment of said target scene capture mode to further identify the first target scene image, said second prompting message requesting the user to describe the target scene to provide information conforming to a second image characterization category selected from the group consisting of: an image characterization category identifying who is depicted in the first target scene, an image characterization category identifying what the first target scene depicts, an image characterization category identifying where the first target scene is located, and an image characterization category identifying when the digital image of the first target scene is being captured, said second prompting message requesting information relating to an image characterization category that is different from the category identified in said first prompting message;

capturing the user's verbal description of the first target scene image responding to said second prompting message in substantially real time with the capturing of the first target scene image;

recognizing, by said processing subsystem, the user's description of the target scene in response to said first prompting message and said second prompting message and converting the input image characterization data captured in response to said first prompting message and said second prompting message into text;

generating, by said processing subsystem, a text file identifying a plurality of items characterizing the first target scene including data captured in response to said first prompting message and said second prompting message, associating an image file with a text file identifying the first target scene, said text file including a data package having textual information generated in response to the first prompting message and the second prompting message; and generating a digital photograph of the first target scene having text thereon, said text including image characterization data identifying the first target scene and including text generated in response to the first prompting message and the second prompting message.

10. A method according to claim 9, further including the steps of detecting the state of a control mechanism on the digital device and automatically emailing the digital photograph of the first target scene including its image characterizing text to an email address stored in the digital device in response to the state of the control mechanism.

11. A method according to claim 9, further including the step of prompting the user to enter an email address as a target address for an automatic emailing operation of a subsequently captured digital photograph.

12. A method according to claim 9, further including the step of presenting to the user alternative potential recognized user responses to a prompting message to permit a user to select a correct alternative.

13. A method of operating a digital device having a camera subsystem with enhanced picture identification capability by generating digital photographs of target scenes having a target scene image and descriptive text generated in response to image characterization prompting messages, said digital device having a processing subsystem, and a storage device, said method comprising the steps of:

capturing a digital image of a first target scene image during a target scene capture mode, said target scene capture mode including an image capturing segment and an image characterization data capturing segment;

accessing information from said storage device indicative of a first image characterization prompting message selected from a group consisting of: an image characterization prompting message prompting the identification of who is depicted in the target scene, an image characterization prompting message prompting the identification of what the target scene depicts, an image characterization prompting message prompting the identification of where the target scene is located, and an image characterization prompting message prompting the identification of when the digital image of the target scene is being captured;

presenting to the user, by said processing subsystem, said first prompting message to prompt the user to verbally input image characterization data identifying the first target scene image during said image characterization data capturing segment of said target scene capture mode, said first prompting message requesting the user to describe the first target scene to provide information conforming to a first image characterization category selected from the group consisting of: a first image characterization category identifying who is depicted in the first target scene, a second image characterization category identifying what the first target scene depicts, a third image characterization category identifying where the target scene is located, and a fourth image characterization category identifying when the digital image of the first target scene is being captured;

capturing a user's verbal description of the first target scene image that is in response to said first prompting message in substantially real time with the capturing of the first target scene image;

accessing from said storage device information indicative of a second image characterization prompting message selected from a group consisting of: an image characterization prompting message prompting the identification of who is depicted in the first target scene, an image characterization prompting message prompting the identification of what the first target scene depicts, an image characterization prompting message prompting the identification of where the first target scene is located, and an image characterization prompting message prompting the identification of when the digital image of the first target scene is being captured;

presenting to the user, by said processing subsystem during said image characterization data capturing segment of said target scene capture mode, said second prompting message to prompt the user to verbally input image characterization data further identifying the first target scene image, said second prompting message requesting the user to describe the first target scene to provide information conforming to a second image characterization category selected from the group consisting of: an image characterization category identifying who is depicted in the first target scene, an image characterization category identifying what the first target scene depicts, an image characterization category identifying where the first target scene is located, and an image characterization category identifying when the digital image of the first target scene is being captured, said second prompting message requesting information relating to an image characterization category that is different from the category identified in said first prompting message;

capturing a user's verbal description of the first target scene image that is in response to said second prompting message in substantially real time with the capturing of the first target scene image;

converting the input image characterization data captured in response to said first prompting message and said second prompting message into text and generating a text file identifying a plurality of items characterizing the first target scene, associating an image file of the first target scene with a text file identifying the first target scene, said text file including a data package having textual information generated in response to the first prompting message and the second prompting message; and generating a digital photograph of the first target scene having text thereon, said text including image characterization data identifying the first target scene and including text generated in response to the first prompting message and the second prompting message.

14. A method according to claim 13, wherein the steps of presenting the first prompting message and presenting the second prompting message include the steps of requesting the user to verbally input who is depicted in the first target scene image and the location of the first scene.

15. A method according to claim 13, wherein the steps of presenting the first prompting message and presenting the second prompting message include the steps of requesting the user to verbally input who is depicted in the first target scene image and the date the picture was taken.

16. A method according to claim 13, further including the step of generating at least one prompting message requesting the user to verbally input the occasion depicted in the first target scene.

17. A method according to claim 13, further including the steps of detecting the state of a control mechanism on the digital device and automatically emailing the digital photograph of the first target scene including its image characterizing text to an email address stored in the digital device in response to the state of the control mechanism.

18. A method according to claim 13, further including the step of prompting the user to enter an email address as a target address for an automatic emailing operation of a subsequently captured digital photograph.

19. A method according to claim 13, further including the step of presenting to the user alternative potential recognized user responses to a prompting message to permit a user to select a correct alternative.

* * * * *